United States Patent
Maejima et al.

(10) Patent No.: US 10,252,165 B2
(45) Date of Patent: Apr. 9, 2019

(54) RECORDING MEDIUM, DATA PROCESSING APPARATUS AND DATA PROCESSING METHOD

(71) Applicant: KOEI TECMO GAMES CO., LTD., Kanagawa (JP)

(72) Inventors: Kazunori Maejima, Kanagawa (JP); Syota Iwasa, Kanagawa (JP)

(73) Assignee: KOEI TECMO GAMES CO., LTD., Kanagawa (JP)

( * ) Notice: Subject to any disclaimer, the term of this patent is extended or adjusted under 35 U.S.C. 154(b) by 0 days.

(21) Appl. No.: 15/488,661

(22) Filed: Apr. 17, 2017

(65) Prior Publication Data

US 2017/0326451 A1 Nov. 16, 2017

(30) Foreign Application Priority Data

May 12, 2016 (JP) .................. 2016-096252

(51) Int. Cl.
*A63F 13/58* (2014.01)
*A63F 13/847* (2014.01)

(52) U.S. Cl.
CPC ............ *A63F 13/58* (2014.09); *A63F 13/847* (2014.09); *A63F 2300/65* (2013.01)

(58) Field of Classification Search
CPC ..... A63F 13/58; A63F 13/847; A63F 2300/65
See application file for complete search history.

(56) References Cited

U.S. PATENT DOCUMENTS

2015/0174487 A1 6/2015 Tabata

FOREIGN PATENT DOCUMENTS

| JP | 2005-169062 | 6/2005 |
| JP | 2006-326021 | 12/2006 |
| JP | 2015-165904 | 9/2015 |

OTHER PUBLICATIONS

Soul Sacrifice (video game), Wikipedia, https://en.wikipedia.org/wiki/Soul_Sacrifice_(video_game), retrieved Mar. 20, 2018.*
In Soul Sacrifice, Death Can Be a Good Thing, by Evan Narcisse on Apr. 30, 2013, https://kotaku.com/in-soul-sacrifice-death-can-be-the-ultimate-power-up-485509382.*
PSVita: Soul Sacrifice Online Coop Experience, by Marc the Geek, Published on May 1, 2013, https://www.youtube.com/watch?v=dVjOJp1mT7w.*

(Continued)

*Primary Examiner* — Jasson H Yoo

(74) *Attorney, Agent, or Firm* — IPUSA, PLLC

(57) ABSTRACT

A non-transitory computer-readable recording medium having recorded thereon a game program that causes a computer of a data processing apparatus to execute a method includes: accepting an instruction to operate a first object in a game from a first player, and activating the first object in the game; determining an action state of the first object in the game; and when the first object is determined to be in an incapacitated state in which the first object is unable to be activated in the game, accepting an instruction to perform a support process for a second object in the game from the first player, and performing the support process based on the instruction to perform the support process.

8 Claims, 7 Drawing Sheets

(56) References Cited

OTHER PUBLICATIONS

Strategy book of fighting together in Soul Sacrifice, Dengeki PlayStation, No. 3/28 vol. 538 Special appendix, ASCII Media Works, on Mar. 14, 2013, vol. 538, pp. 1, 8, and 24, with English concise explanation (reference provided by Applicant with English concise explanation).*
League of Legends Wiki Stack (published version Sep. 22, 2014; https://web.archive.org/web/20140922012035/http://leagueoflegends.wikia.com/wiki/Stack; original website: http://leagueoflegends.wikia.com/wiki/Stack; retrieved using Waybackmachine https://web.archive.org/).*
League of Legends from Wikipedia, https://en.wikipedia.org/wiki/League_of_Legends, Apr. 20, 2014 edition, (retrieved from wayback https://web.archive.org/web/20140420052443/https://en.wikipedia.org/wiki/League_of_Legends).*
Buff, http://leagueoflegends.wikia.com/wiki/Buff, Mar. 4, 2014 edition, (retrieved from wayback https://web.archive.org/web/20140304170048/http://leagueoflegends.wikia.com/wiki/Buff).*
Armor, http://leagueoflegends.wikia.com/wiki/Armor, Apr. 11, 2014 edition, (retrieved from wayback, https://web.archive.org/web/20140411132636/http://leagueoflegends.wikia.com/wiki/Armor).*
Reginald—Kassadin vs Lee Sin—mid «Maniac» (Diamond I), by Fiss Mortune, Published on Jul. 21, 2013, retrieved on Dec. 13, 2018, from https://www.youtube.com/watch?v=ZvhDVp3F5fM (Year: 2013).*
Japanese Office Action for 2016-096252 dated Jun. 27, 2017.
Soul Sacrifice, The First Story, Dengeki PlayStation, ASCII Media Works, vol. 19 the twelfth, on Mar. 14, 2013, pp. 175 to 178, with English concise explanation.
Strategy book of fighting together in Soul Sacrifice, Dengeki PlayStation, No. 3/28 vol. 538 Special appendix, ASCII Media Works, on Mar. 14, 2013, vol. 538, pp. 1, 8, and 24, with English concise explanation.

* cited by examiner

RECORDING MEDIUM, DATA PROCESSING APPARATUS AND DATA PROCESSING METHOD

CROSS-REFERENCE TO RELATED APPLICATION

The present application is based on and claims the benefit of priority of Japanese Priority Application No. 2016-096252 filed on May 12, 2016, the entire contents of which are hereby incorporated by reference.

BACKGROUND OF THE INVENTION

1. Field of the Invention

The present invention relates to a recording medium, a data processing apparatus and a data processing method.

2. Description of the Related Art

A game device is known to which a plurality of players connect their controllers, respectively, and by which the plurality of players can play a game in a same virtual space by cooperating with each other. Each of the players selects a player character used in the game, and plays the game using the selected player character.

However, there is a case, while the plurality of players are playing the game, in which a player character of one of the players is in an incapacitated state by an attack from an enemy or the like. In such a case, the one of the players cannot participate in the game for a certain period.

Various methods are suggested regarding other players, even when a player character of one of the players becomes an incapacitated state, to continue the game. For example, Patent Document 1 discloses a method, when a player character of one of the players becomes an incapacitated state, in which a game device sends a request of helping to a player of another game device via a network, and the player of the other game device participates in the game.

However, according to the conventionally suggested method, when a player character operated by one of the players becomes an incapacitated state, although a method regarding other players to continue the game is suggested, a method for the one of the players to continue the game is not suggested. Thus, there is a risk that the player who operates the player character who becomes the incapacitated state cannot obtain an immersion into the game for a certain period.

Patent Document

[Patent Document 1] Japanese Laid-open Patent Publication No. 2015-165904

SUMMARY OF THE INVENTION

The present invention is made in light of the above problems, and provides a method of retaining an immersion into a game for a player even when a player character of the player becomes an incapacitated state.

According to an embodiment, there is provided a non-transitory computer-readable recording medium having recorded thereon a game program that causes a computer of a data processing apparatus to execute a method including: accepting an instruction to operate a first object in a game from a first player, and activating the first object in the game; determining an action state of the first object in the game; and when the first object is determined to be in an incapacitated state in which the first object is unable to be activated in the game, accepting an instruction to perform a support process for a second object in the game from the first player, and performing the support process based on the instruction to perform the support process.

BRIEF DESCRIPTION OF THE DRAWINGS

Other objects, features and advantages of the present invention will become more apparent from the following detailed description when read in conjunction with the accompanying drawings.

DETAILED DESCRIPTION OF THE PREFERRED EMBODIMENTS

Figure 1:
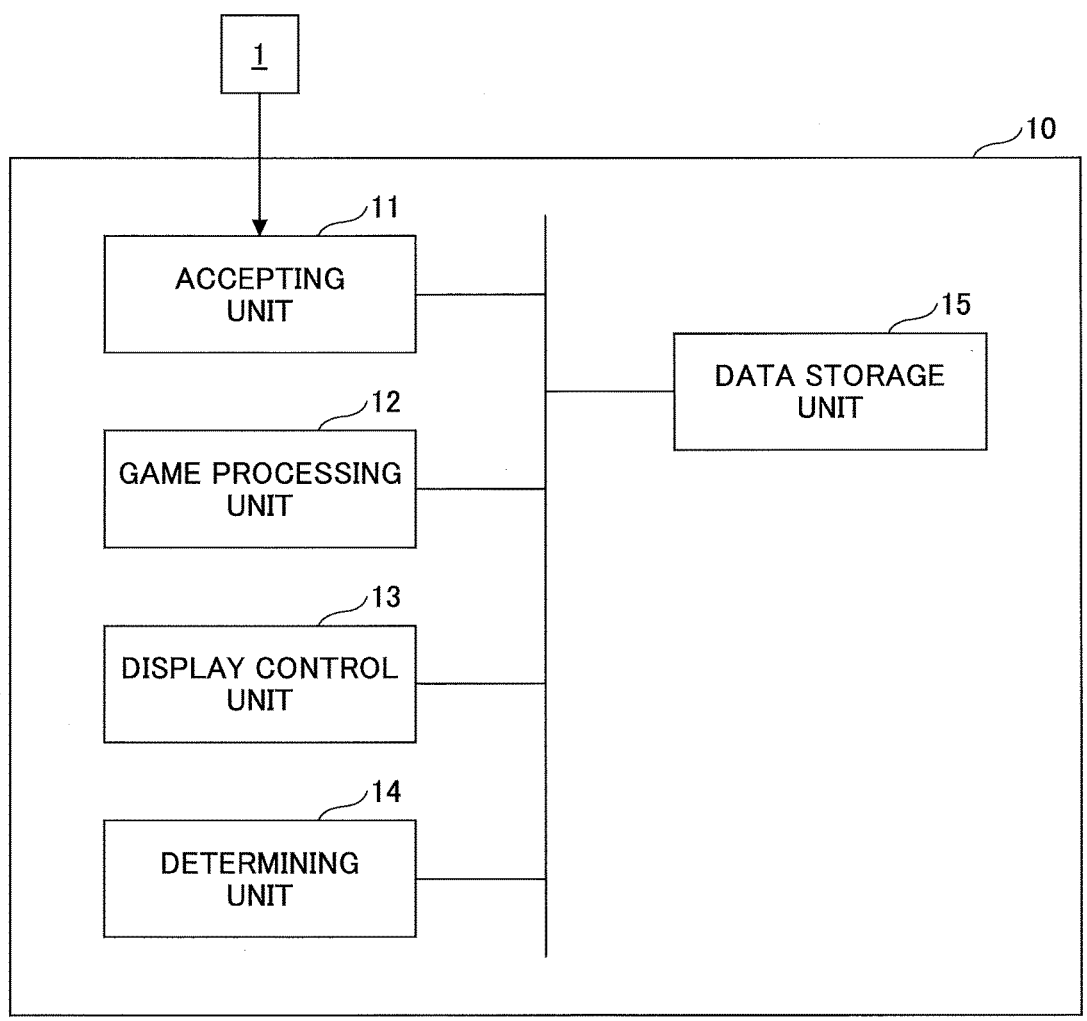
FIG. 1 is a view illustrating an example of a functional structure of a data processing apparatus of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

(Functional Structure of Data Processing Apparatus)

First, an example of a functional structure of a data processing apparatus 10 of an embodiment is described with reference to FIG. 1. The data processing apparatus 10 of the embodiment may be any one of electronic devices such as a personal computer, a tablet terminal, a game device or a smartphone.

The data processing apparatus 10 includes an accepting unit 11, a game processing unit 12, a display control unit 13, a determining unit 14 and a data storage unit 15.

The accepting unit 11 accepts an operation in a game by a player. For example, the accepting unit 11 accepts an input operation performed by the player in the game using an input device such as a controller 1. The accepting unit 11 is capable of accepting instructions from a plurality of input devices at the same time. The operation in the game includes an operation to activate an object in the game while performing a game process. As an example of the object in the game, a player character PC may be exemplified.

Although the game process is exemplified in which the player character PC is activated upon accepting an instruction to operate a player character PC in the following, the same game process may be applied for a predetermined object in a game, other than the player character PC.

The game processing unit 12 executes a game program stored in the data storage unit 15. When the accepting unit 11 accepts an operation for a player character PC by the player, the game processing unit 12 controls the player character PC.

As a result of the game process, when a player character PC1 operated by a first player becomes an incapacitated state, the game processing unit 12 does not perform an operation for the player character PC1 for a predetermined period. When the player character PC1 becomes the incapacitated state, and when the accepting unit 11 accepts an instruction from the first player, the game processing unit 12 performs a support process in the game for another player (hereinafter, referred to as "second player" as well).

Here, the support process in the game means a process regarding improving an ability score of a player character PC2 of the second player, or a process of displaying a message. The process regarding improving the ability score means to improve various ability scores set for the player character PC2 of the second player. For example, the game processing unit 12 may improve a value of a hit point HP of the player character PC2 that indicates a damage capable for the player character PC2 to endure, a tension gauge value of the player character PC2 for performing a special skill, or a value of a magic point MP of the player character PC2 that is consumed by the player character PC2 for using a special ability such as a magic. Further, the process of displaying the message means a process to display a support message or the like for the second player who is playing the game.

The display control unit 13 generates an image in accordance with an instruction to generate an image from the game processing unit 12, and outputs the generated image to a screen. The screen to which the generated image is output is an external display connected to the data processing apparatus 10, or a display included in the data processing apparatus 10, for example.

The determining unit 14 refers to a processed result of the game processing unit 12, and determines an action state of the player character PC.

The data storage unit 15 stores various data in addition to the game program.

(Hardware Structure of Data Processing Apparatus)

Figure 2:
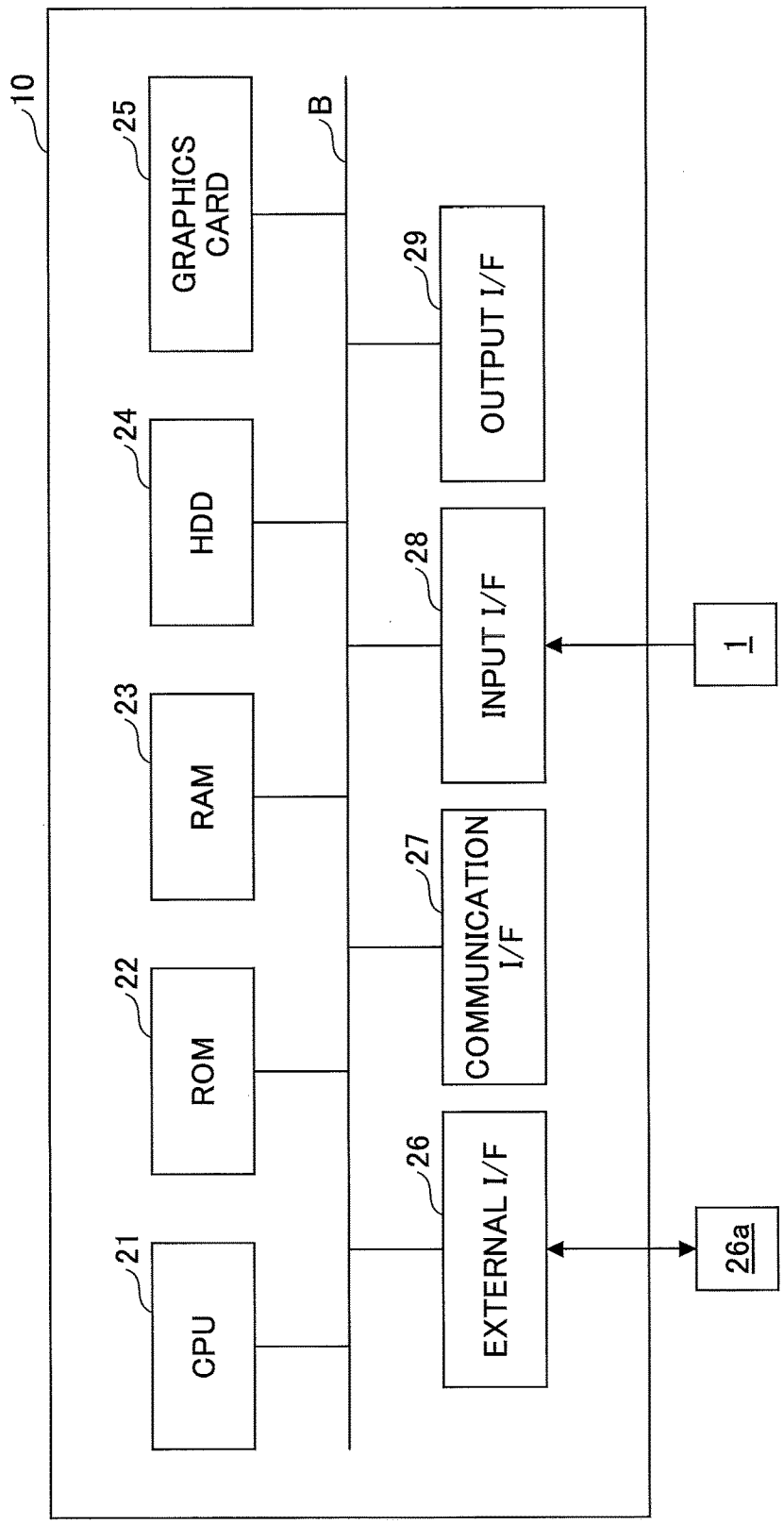
FIG. 2 is a view illustrating an example of a hardware structure of the data processing apparatus of the embodiment.

Next, an example of a hardware structure of the data processing apparatus 10 of the embodiment is described with reference to FIG. 2. The data processing apparatus 10 of the embodiment includes a Central Processing Unit (CPU) 21, a Read Only Memory (ROM) 22, a Random Access Memory (RAM) 23, a Hard Disk Drive (HDD) 24, a graphics card 25, an external I/F (Interface) 26, a communication I/F 27, an input I/F 28 and an output I/F 29. These components are connected by a bus B with each other.

The CPU 21 is an arithmetic unit that actualizes controls and functions of the data processing apparatus 10 by reading out programs or data from the ROM 22, the HDD 24 or the like on the RAM 23 to perform processes. Specifically, the game processing unit 12 and the determining unit 14 are actualized by causing the CPU 21 to execute one or more programs installed in the data processing apparatus 10.

The ROM 22 is a nonvolatile semiconductor memory, for example, capable of storing internal data even when power is not supplied. Programs or data are stored in the ROM 22. The RAM 23 is a volatile semiconductor memory, for example, that temporarily stores programs or data.

The HDD 24 is a nonvolatile memory device that stores programs or data. The programs stored in the HDD 24 include basic software that controls the entirety of the data processing apparatus 10 and application software. Various databases may be stored in the HDD 24. In this embodiment, the data storage unit 15 is actualized by the HDD 24, for example.

The external I/F 26 is an interface that connects the data processing apparatus 10 to an external device. As the external device, a recording medium 26a or the like may be exemplified. With this, the data processing apparatus 10 is capable of reading out data from and writing data on the recording medium 26a via the external I/F 26. As the recording medium 26a, a Compact Disk (CD), a Digital Versatile Disk (DVD), an SD memory card, an Universal Serial Bus (USB) memory or the like may be exemplified.

For example, it is possible to mount the recording medium 26a storing the game program on the data processing apparatus 10. Such a program is read out by the external I/F 26 and read by the RAM 23.

The CPU 21 executes various programs loaded on the RAM 23 and instructs the graphics card 25 to output an image corresponding to the progression of the game. The graphics card 25 performs an imaging process for a game image to be displayed in a screen in accordance with the instruction, and causes an external display or the like to display the game image via the output I/F.

The communication I/F 27 is an interface that connects the data processing apparatus 10 to a network. Further, the communication I/F 27 may have a function to communicate with other game devices via a communication unit that has an antenna.

The input I/F 28 is an interface to be connected to the controller 1, which is an example of the input device. The controller 1 includes an operation button and a cursor key. A player can play a game by operating the controller 1. Specifically, the player can control a player character PC to perform a predetermined action, for example, by operating the operation button. Further, the player can control the player character PC to move in a predetermined direction, for example, by operating the cursor key. The input I/F 28 stores input data based on the input operation performed by the player using the controller 1 in the RAM 23. The CPU 21 performs various arithmetic processes regarding the action of the player character PC based on the input data stored in the RAM 23.

The output I/F 29 is an interface to be connected to an external display or an external speaker. The game image processed by the graphics card 25 is sent to the external display via the output I/F 29, for example.

The data processing apparatus 10 may include a display and a speaker. In such a case, the image of the game is displayed on the display, and a predetermined sound is output from the speaker in accordance with a progression of the game.

(Game Process)

Figure 3:
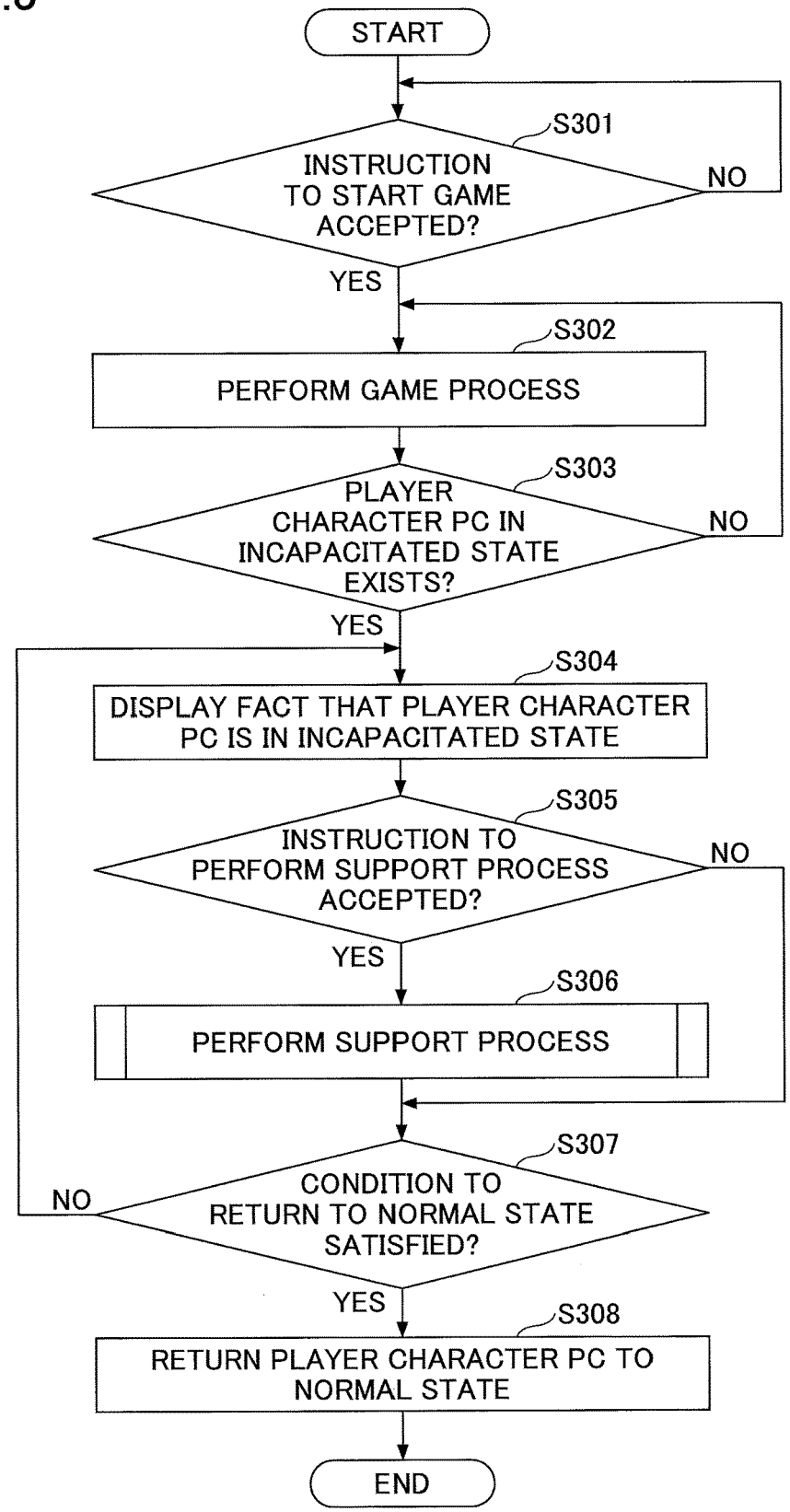
FIG. 3 is a flowchart illustrating an example of a game process of the embodiment.

Next, an example of the game process of the embodiment is described with reference to FIG. 3 and FIG. 4. FIG. 3 is a flowchart illustrating an example of the game process of the embodiment. Here, it is assumed that a player A operates a player character PC#A using a controller 1A, a player B operates a player character PC#B using a controller 1B, and a player C operates a player character PC#C using a controller 1C. The controller 1A, the controller 1B and the controller 10 may be simply referred to as the controller 1 as well.

The controllers 1 may be connected to a same data processing apparatus 10, or may be connected to different data processing apparatuses 10, respectively. When the controllers 1 are connected to the different data processing apparatuses 10, respectively, the data processing apparatuses 10 may cooperate with each other to perform the game process.

Actions of the player character PC#A, the player character PC#B and the player character PC#C will be described later with reference to FIG. 5 to FIG. 7.

In step S301, the accepting unit 11 determines whether an instruction to start the game is accepted. When the accepting unit 11 accepts the instruction to start the game from either of the controller 1A, the controller 1B or the controller 10 (YES of step S301), the process proceeds to step S302.

On the other hand, if the accepting unit 11 does not accept the instruction to start the game from either of the controller 1A, the controller 1B or the controller 10 (NO of step S301), the process of determination in step S301 is repeated.

In step S302, the game processing unit 12 performs the game process. The game processing unit 12 calculates an action of the player character PC (#A, #B, #C) based on an instruction to the player character PC (#A, #B, #C) accepted by the accepting unit 11 via the controller (1A, 1B, 1C), and progresses the game. The display control unit 13, upon receiving an instruction from the game processing unit 12, generates an image in accordance with a progression state of the game, and displays the generated image in the screen.

In step S303, the determining unit 14 refers to a result of the game process by the game processing unit 12, and determines an action state of the player character PC (#A, #B, #C).

When either of the player character PC (#A, #B, #C) is determined to be in an incapacitated state (YES of step S303), the process proceeds to step S304. On the other hand, when all of the player characters PC (#A, #B and #C) are determined to be an enabled state, in other words, at a normal state (NO of step S303), the process returns to step S302. Here, the incapacitated state means a case in which a hit point HP of the player character PC becomes zero while the game process is being performed or a case when the player character PC is in a predetermined state (a "frozen" state, a "sleeping" state or the like, for example) set in the game, for example.

In step S304, when the determining unit 14 determines that the player character PC is in the incapacitated state, the display control unit 13 displays a fact that the player character PC is in the incapacitated state in a screen. The following description assumes that the player character PC#A operated by the player A transitions to the incapacitated state.

In step S305, the accepting unit 11 determines whether an instruction to perform a support process for the currently played game is accepted from the controller 1A. Here, the instruction to perform the support process means an instruction to display a message to the player B and the player C who are playing the game, or an operation to improve the ability score of at least one of the player character PC#B and the player character PC#C, for example. When such an instruction is accepted (YES of step S305), the process proceeds to step S306. On the other hand, when such an instruction is not accepted (NO of step S305), the process proceeds to step S307.

In step S306, the game processing unit 12 performs the support process corresponding to the instruction accepted by the accepting unit 11 from the controller 1A. The content of the support process is described later.

In step S307, the determining unit 14 determines whether a predetermined condition to return to the normal state is satisfied. When the predetermined condition is satisfied (YES of step S307), the process proceeds to step S308. On the other hand, when the predetermined condition is not satisfied (NO of step S307), the process returns to step S304.

Here, the determining unit 14 may determine that the predetermined condition is satisfied when a predetermined period has passed since the player character PC#A becomes the incapacitated state. Further, the determining unit 14 may determine that the predetermined condition is satisfied when the accepting unit 11 accepts a predetermined operation to the player character PC#A via the controller 1B or the controller 1C. Here, the predetermined operation is an operation to return the state of the player character PC#A to the normal state. Specifically, the predetermined operation is, for example, an operation to recover the hit point HP of the player character PC#A, an operation to melt the player character PC#A that is at the "frozen" state or the like.

In step S308, the determining unit 14 instructs the game processing unit 12 to return the state of the player character PC#A to the normal state. Upon receiving the instruction, the game processing unit 12 changes the state of the player character PC#A from the incapacitated state to the normal state.

Next, the process of step S306, in other words, the support process of the game process that is performed based on the instruction from the controller 1A when the player character PC#A is in the incapacitated state is described with reference to FIG. 4.

Similar to FIG. 3, it is assumed that the player A operates the player character PC#A using the controller 1A, the player B operates the player character PC#B using the controller 1B, and the player C operates the player character PC#C using the controller 1C.

In step S401, the game processing unit 12 determines whether the instruction accepted by the accepting unit 11 from the controller 1A is an instruction to "display a message" or an instruction to "improve an ability score". When the instruction to "display a message" is accepted, the process proceeds to step S402. Meanwhile, when the instruction to "improve an ability score" is accepted, the process proceeds to step S404.

In step S402, the accepting unit 11 accepts a selection of a message. When the accepting unit 11 accepts the selection of the message, the game processing unit 12 instructs the display control unit 13 to display the message.

In step S403, the display control unit 13 displays the selected message in the screen.

Here, when the message to display is previously determined, the process of step S402 to select the message may be omitted. Further, an input of a message from the player A may be accepted, and the input message may be displayed. In such a case, instead of the process of step S402 of selection, a process of inputting the message is performed.

In step S404, the accepting unit 11 accepts a selection of a player character PC for which the support process is to be performed. In such a case, the accepting unit 11 accepts a selection of at least one of the player character PC#B and the player character PC#C via the controller 1A.

In step S405, the accepting unit 11 accepts a selection of an ability score to be improved via the controller 1A. The accepting unit 11, for example, accepts an instruction to improve a hit point HP, a tension gauge value, or an offensive power.

In step S406, in accordance with the instruction content accepted by the accepting unit 11, the game processing unit 12 performs a process to improve the ability score set for the player character PC. Further, the display control unit 13, upon accepting the instruction of the game processing unit 12, displays a fact that the ability score set for the player character PC is improved in the screen.

Figure 4:
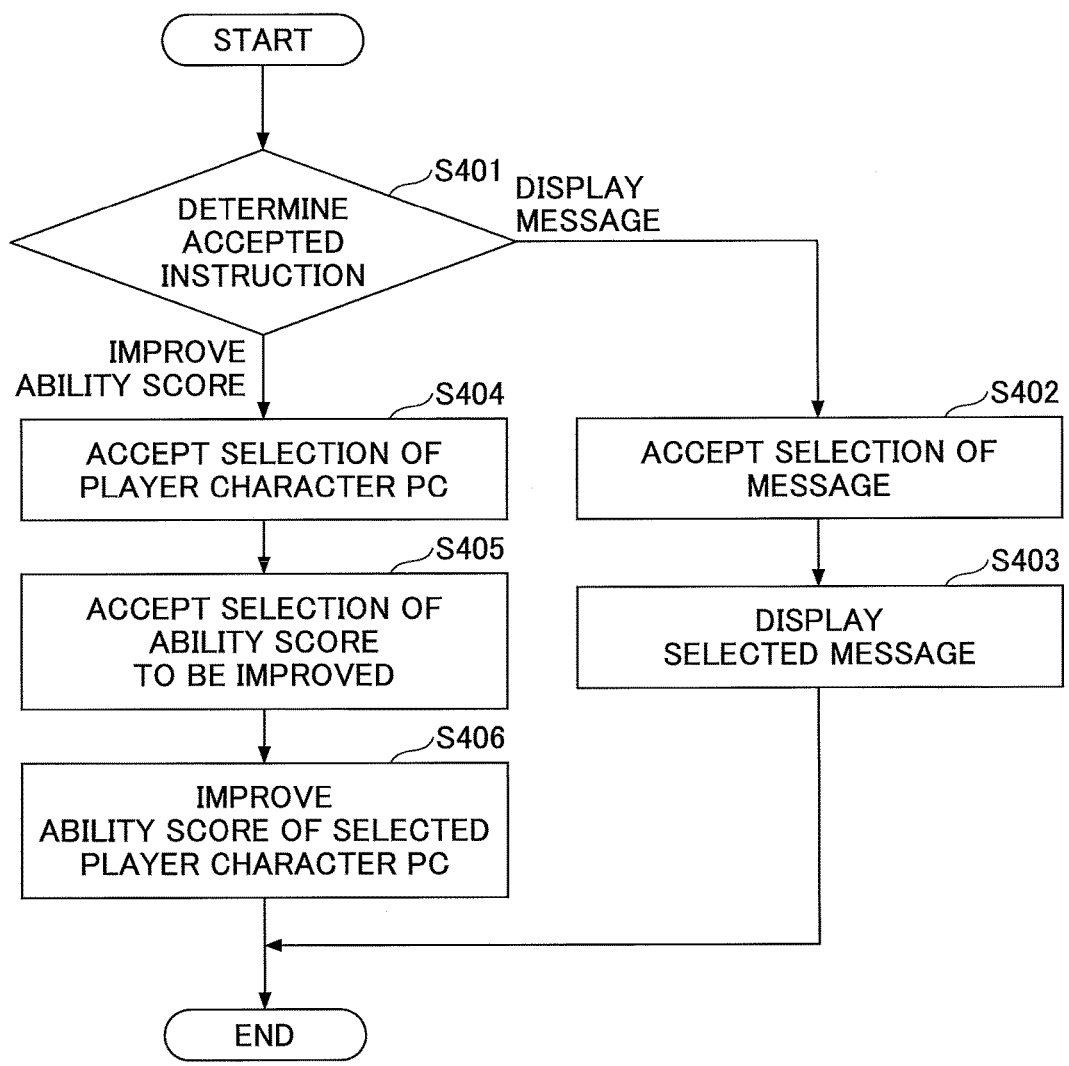
FIG. 4 is a flowchart illustrating an example of a support process of the embodiment.

Here, the support process of FIG. 4 may be performed for a plurality of times, upon accepting the instruction from the player A, during a period when the player character PC#A is in the incapacitated state. Further, when the player character PC for which the ability score is to be improved is previously set, or when the type of the ability score to be improved is previously set, the process of step S404 to select the player character PC or the process of step S405 to select the ability score to be improved may be omitted.

Although a case is described in which the processes to "display a message" and "improve an ability score" are exemplified for the support process of FIG. 4, other support processes may be performed. In such a case, the game processing unit 12 determines a content of the instruction of the "support process" accepted by the accepting unit 11 in step S401, and performs the support process corresponding to the accepted instruction.

Further, in the above described embodiment, an example is described in which the player characters PC are activated in accordance with the operations from the players, respectively. Alternatively, even when the player character PC and a non-player character NPC are activated at the same time, the support process in the game may be performed. For example, the data processing apparatus 10 may perform the support process in the game for the non-player character NPC based on an instruction from a player who operates the player character PC in the incapacitated state.

In the above embodiment, a case is described in which the support process for the other player character PC at the normal state is performed when one of the player characters PC is in the incapacitated state. Alternatively, even when the plurality of player characters are in the incapacitated state, the support process for the other player character PC at the normal state may be similarly performed.

For example, it is assumed that the player character PC#A, the player character PC#B and the player character PC#C are in the incapacitated state, and a player character PC#D is at the normal state. In such a case, the accepting unit 11 may accept instructions to support the player character PC#D from three players operating the player characters PC (#A, #B and #C) in the incapacitated state, respectively. Then, the game processing unit 12 may perform the support process for the player character PC#D based on the instructions from the three players.

When the instructions accepted from the plurality of (three) players are to improve the ability score, respectively, the game processing unit 12 may perform the support process such that an improving amount (improving width) of the ability score of the player character PC#D becomes greater than a case when the instruction to support the player character PC#D is accepted only from one of the players.

Here, for example, it is assumed that the improving amount of the ability score of the player character PC#D when the instruction is accepted only from one of the players is a unit improving amount. In such a case, when the instructions to improve the ability score of the player character PC#D are accepted from the three players, respectively, the improving amount of the ability score of the player character PC#D may be greater than (ten times, for example) three times of the unit improving amount. This means that, when the instructions to improve the ability score is accepted from N players, respectively, the game processing unit 12 may improve the ability score by the improving amount that is greater than N times of the unit improving amount. With this configuration, as an effect of the support process is increased, even when the plurality of player characters PC are in the incapacitated state, an immersion into the game for each of the players can be retained.

(Example of Screen Display)

Next, an example of a screen display when performing the game process is described with reference to FIG. 5 to FIG. 7.

Figure 5:
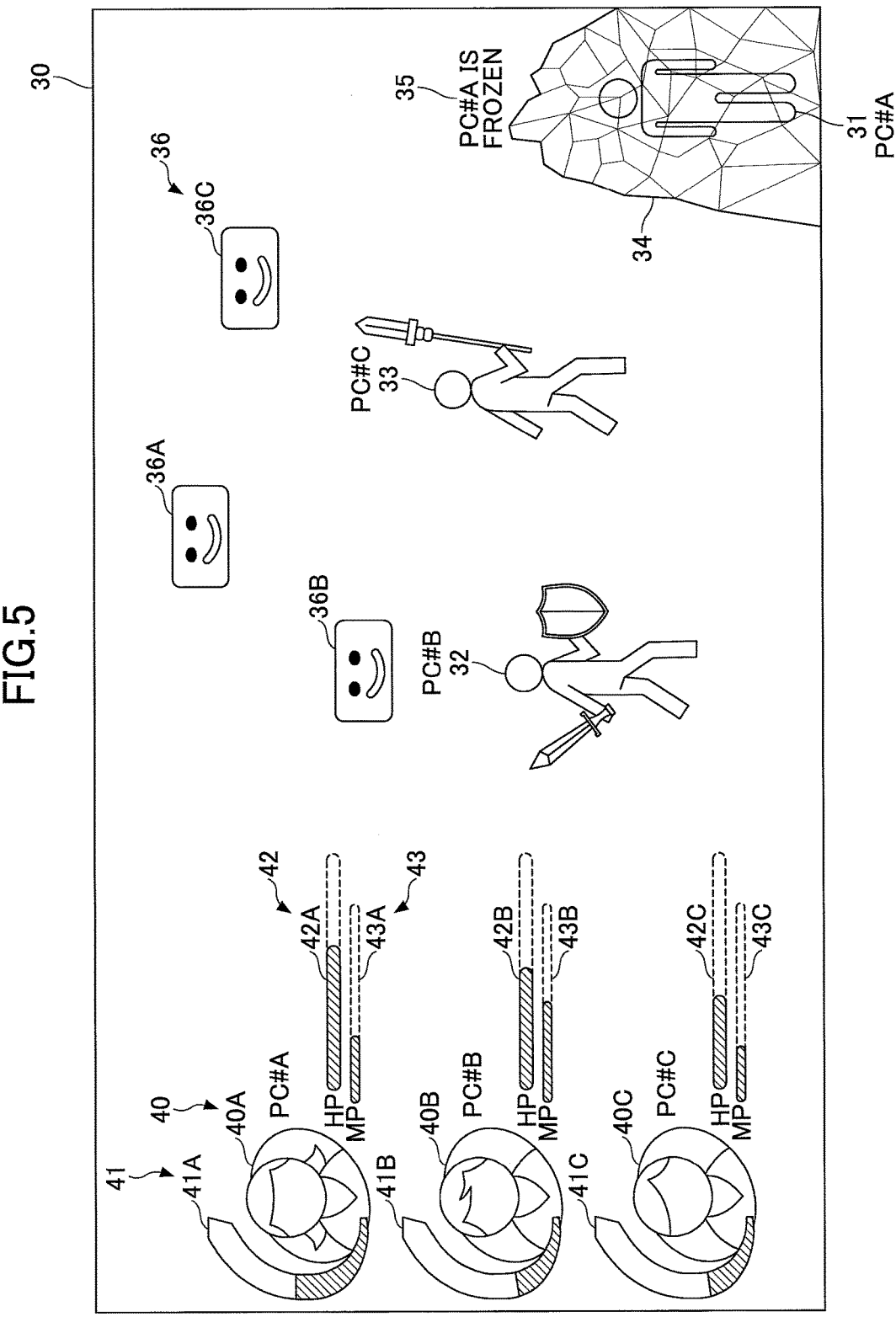
FIG. 5 is a view illustrating an example of a screen of the embodiment in which an incapacitated state of a player character is displayed.

FIG. 5 is a view illustrating an example of a display of a screen in step S304. It is displayed in a screen 30 that a player character PC#A 31, who is in the incapacitated state, is wrapped by a body of ice 34. Further, a message 35 indicating that the player character PC#A 31 is in the incapacitated state such as "PC#A is frozen" is also displayed in the screen 30.

As a player character PC#B 32 and a player character PC#C 33 are at the normal state, the game process is executed based on operations to the player character PC#B 32 and the player character PC#C 33, respectively. In FIG. 5, a scene in which the player character PC#B 32 and the player character PC#C 33 are fighting against monsters 36 (36A, 36B, 36C) is displayed. Further, icons 40 (40A, 40B, 40C), tension gauges 41 (41A, 41B, 41C), hit points HP 42 (42A, 42B, 42C) and magic points MP 43 (43A, 43B, 43C) of the player characters, respectively, are also displayed at a predetermined area in the screen 30.

Figure 6:
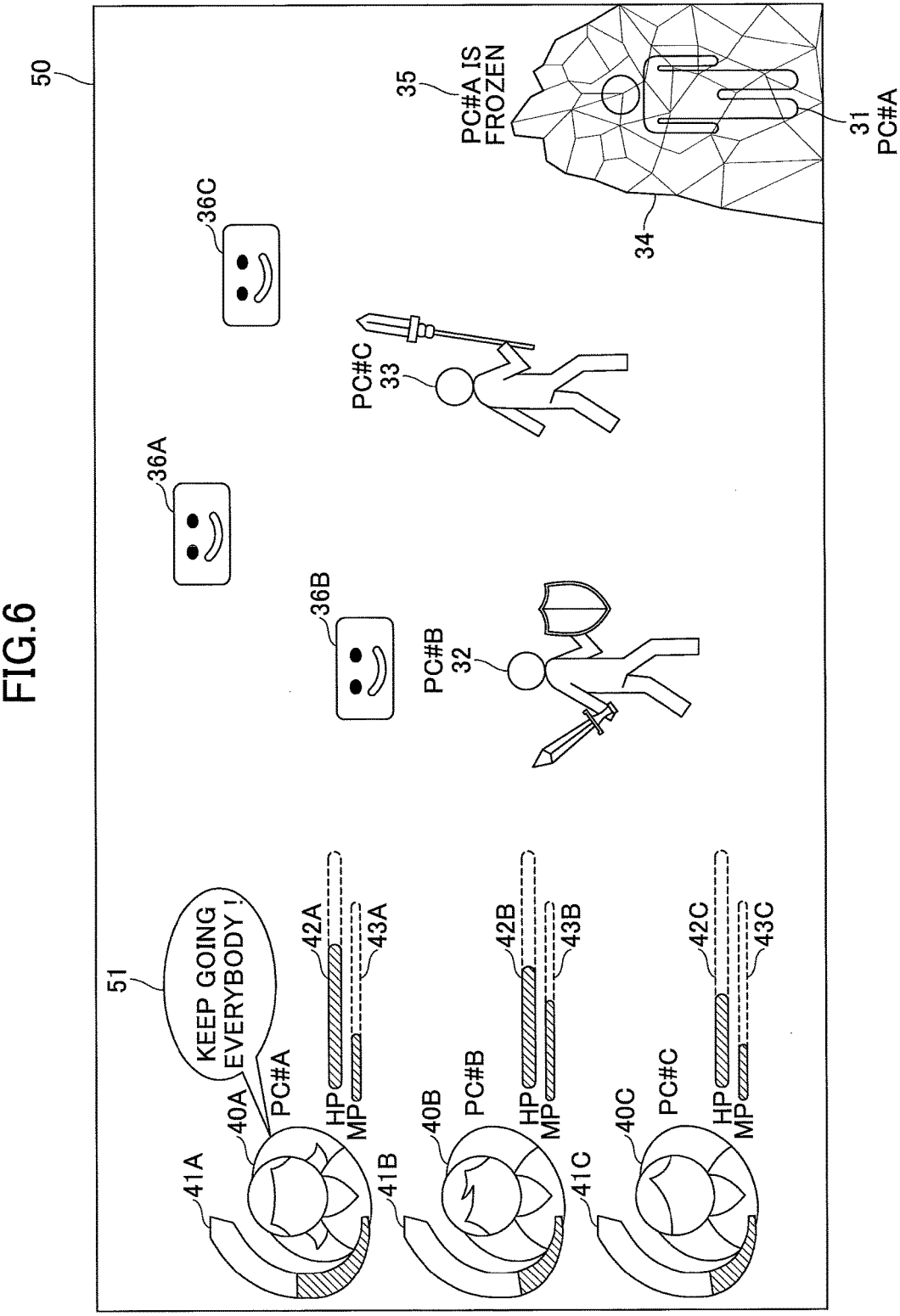
FIG. 6 is a view illustrating an example of a screen of the embodiment when the support process (to display a message) is performed.

FIG. 6 is a view illustrating an example of a display of a screen in step S403. A message 51 ("keep going everybody !") is displayed in a screen 50 as a message from the player character PC#A 31 who is in the incapacitated state.

Figure 7:
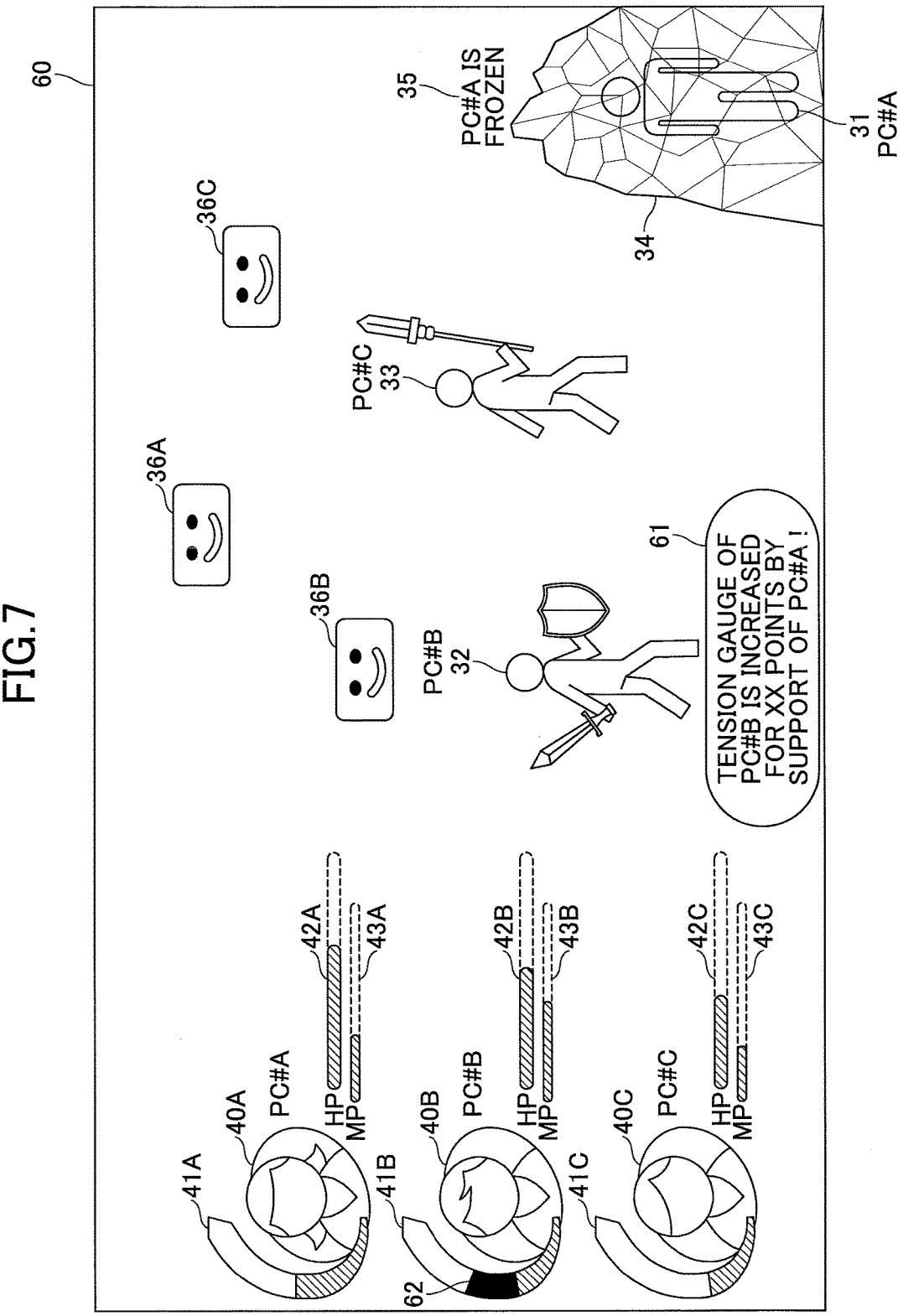
FIG. 7 is a view illustrating an example of a screen of the embodiment when the support process (to improve ability score) is performed.

FIG. 7 is a view illustrating an example of a display in a screen in step S406. A message 61 ("tension gauge of PC#B is increased for XX points by support of PC#A!") indicating that the tension gauge 41B of the player character PC#B is increased by the support of the player character PC#A 31 in the incapacitated state is displayed in a screen 60. At this time, display of the tension gauge 41B of the player character PC#B is also changed to increase for XX points (illustrated by "62").

(Summary)

According to the game process of the embodiment, even when a player character PC operated by a player is in the incapacitated state, the player is capable of displaying a message for another player, or capable of supporting the other player in the game. Thus, even when the player character PC becomes the incapacitated state, the player can continue the game without losing an immersion into the game.

(Others)

A case is described in the above embodiment in which a plurality of the controllers 1 are connected to the single data processing apparatus 10, and a game is played by a plurality of players. Alternatively, a plurality of the data processing apparatuses 10 may be connected via a network, and the game may be played in each of the data processing apparatuses 10 in the same virtual space. In such a case, each of the players participate in the game by using the controller 1 connected to the respective data processing apparatus 10.

According to the embodiment, it is possible for a player to retain an immersion into a game even when a player character of the player becomes an incapacitated state.

Although a preferred embodiment of the recording medium, the data processing apparatus and the data processing method has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention.

The individual constituents of the data processing apparatus 10 may be embodied by arbitrary combinations of hardware and software, typified by a CPU of an arbitrary computer, a memory, a program loaded in the memory so as to embody the constituents illustrated in the drawings, a storage unit for storing the program such as a hard disk, and an interface for network connection. It may be understood by those skilled in the art that methods and devices for the embodiment allow various modifications.

What is claimed is:

1. A non-transitory computer-readable recording medium having recorded thereon a game program that causes a computer of a data processing apparatus to execute a method comprising:

accepting an instruction to operate a first object, a second object and a third object in a game from a first player, a second player and a third player, and activating the first object, the second object and the third object in the game, respectively;

determining an action state of each of the first object and the third object in the game;

when the first object is determined to be in an incapacitated state in which the first object is unable to be activated in the game, and an instruction to perform a support process for the second object in the game is accepted from the first player, determining whether the instruction to perform the support process for the second object from the first player is displaying a message for the second object or increasing an ability score of the second object in the game and performing the support process in which the ability score of the second object in the game is increased for a first value if it is determined that the instruction to perform the support process from the first player is increasing the ability score of the second object, the support process for the second object from the first player is only one of the displaying the message for the second object and the increasing the ability score of the second object; and when the third object is determined to be in an incapacitated state in which the third object is unable to be activated in the game, and an instruction to perform a support process for the second object in the game is accepted from the third player after the ability score of the second object in the game is increased for the first value based on the instruction from the first player, determining whether the instruction to perform the support process for the second object from the third player is displaying a message for the second object or increasing an ability score of the second object in the game and performing the support process in which the ability score of the second object in the game is increased for a second value if it is determined that the instruction to perform the support process from the third player is increasing the ability score of the second object, the second value being greater than the first value, the support process for the second object from the third player is only one of the displaying the message for the second object and the increasing the ability score of the second object.

2. The non-transitory computer-readable recording medium according to claim 1, wherein the method further includes when the first object is determined to be in the incapacitated state, displaying a fact that the first object is in the incapacitated state in a screen.

3. The non-transitory computer-readable recording medium according to claim 1, wherein the method further includes accepting a selection of the second object for which the support process is to be performed, and wherein the support process is performed for the selected second object in the game.

4. The non-transitory computer-readable recording medium according to claim 1, wherein the instruction to perform the support process for the second object by increasing the ability score of the second object is accepted from the first player via a controller that is used by the first player.

5. The non-transitory computer-readable recording medium according to claim 1, wherein the method further comprises accepting only one instruction to perform the support process for the second object from each of the first player and the third player, and the only one instruction is one of the displaying the message for the second object and the increasing the ability score of the second object in the game.

6. The non-transitory computer-readable recording medium according to claim 1, wherein the message for the second object is previously determined.

7. A data processing apparatus comprising:

a processor; and a memory storing instructions that, when executed, cause the processor to perform processes of accepting an instruction to operate a first object, a second object and a third object in a game from a first player, a second player and a third player, respectively;

activating the first object, the second object and the third object in the game based on the instruction to operate the first object, the second object and the third object, respectively;

determining an action state of each of the first object and the third object, when the first object is determined to be in an incapacitated state in which the first object is unable to be activated in the game and an instruction to perform a support process for the second object in the game is accepted from the first player, determining whether the instruction to perform the support process for the second object from the first player is displaying a message for the second object or increasing an ability score of the second object in the game and performing the support process in which an ability score of the second object in the game is increased for a first value if it is determined that the instruction to perform the support process from the first player is increasing the ability score of the second object, the support process for the second object from the first player is only one of the displaying the message for the second object and the increasing the ability score of the second object; and when the third object is determined to be in an incapacitated state in which the third object is unable to be activated in the game, and an instruction to perform a support process for the second object in the game is accepted from the third player after the ability score of the second object in the game is increased for the first value based on the instruction from the first player, determining whether the instruction to perform the support process for the second object from the third player is displaying a message for the second object or increasing an ability score of the second object in the game and performing the support process in which the ability score of the second object in the game is increased for a second value if it is determined that the instruction to perform the support process from the third player is increasing the ability score of the second object, the second value being greater than the first value, the support process for the second object from the third player is only one of the displaying the message for the second object and the increasing the ability score of the second object.

8. A data processing method comprising:

accepting an instruction to operate a first object, a second object and a third object in a game from a first player, a second player and a third player, and activating the first object, the second object and the third object in the game, respectively;

determining an action state of each of the first object and the third object in the game; and when the first object is determined to be in an incapacitated state in which the first object is unable to be activated in the game, and an instruction to perform a support process for the second object in the game is accepted from the first player, determining whether the instruction to perform the support process for the second object from the first player is displaying a message for the second object or increasing an ability score of the second object in the game and performing the support process in which an ability score of the second object in the game is increased for a first value if it is determined that the instruction to perform the support process from the first player is increasing the ability score of the second object, the support process for the second object from the first player is only one of the displaying the message for the second object and the increasing the ability score of the second object; and when the third object is determined to be in an incapacitated state in which the third object is unable to be activated in the game, and an instruction to perform a support process for the second object in the game is accepted from the third player after the ability score of the second object in the game is increased for the first value based on the instruction from the first player, determining whether the instruction to perform the support process for the second object from the third player is displaying a message for the second object or increasing an ability score of the second object in the game and performing the support process in which the ability score of the second object in the game is increased for a second value if it is determined that the instruction to perform the support process from the third player is increasing the ability score of the second object, the second value being greater than the first value, the support process for the second object from the third player is only one of the displaying the message for the second object and the increasing the ability score of the second object.

* * * * *